United States Patent
Young

(10) Patent No.: US 8,393,986 B2
(45) Date of Patent: Mar. 12, 2013

(54) CAPTIVE FASTENER APPARATUS FOR CHAIN GUIDE OR TENSIONER ARM

(75) Inventor: James D. Young, Chesaning, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 544 days.

(21) Appl. No.: 12/349,826

(22) Filed: Jan. 7, 2009

(65) Prior Publication Data

US 2009/0197724 A1 Aug. 6, 2009

Related U.S. Application Data

(60) Provisional application No. 61/019,693, filed on Jan. 8, 2008.

(51) Int. Cl.
*F16H 7/08* (2006.01)
(52) U.S. Cl. ......................................... 474/101; 411/999
(58) Field of Classification Search .................. 411/999, 411/353, 107
See application file for complete search history.

(56) References Cited

U.S. PATENT DOCUMENTS

| | | | |
|---|---|---|---|
| 5,395,194 | A | 3/1995 | Johnson et al. |
| 5,711,711 | A | 1/1998 | Schmidt, Jr. |
| 5,711,732 | A | 1/1998 | Ferenc et al. |
| RE36,164 | E | 3/1999 | Johnson et al. |
| 6,572,502 | B1 | 6/2003 | Young et al. |
| 7,114,901 | B2 * | 10/2006 | Maruyama et al. ........... 411/353 |
| 2006/0054121 | A1 | 3/2006 | Koch |
| 2006/0188190 | A1 | 8/2006 | Schmidl et al. |
| 2010/0062887 | A1 | 3/2010 | Bodensteiner et al. |

FOREIGN PATENT DOCUMENTS

| | | |
|---|---|---|
| DE | 20 2006 007 821 | 10/2007 |
| EP | 1 431 592 | 6/2004 |
| GB | 2 323 893 | 10/1998 |
| WO | WO 97/33104 | 9/1997 |

OTHER PUBLICATIONS

International Search Report for International application No. PCT/US2009/030300, Jul. 7, 2009.
Written Opinion for International application No. PCT/US2009/030300, Jul. 7, 2009.
Document titled "Applicant's Admitted Prior Art", date unknown.

* cited by examiner

*Primary Examiner* — William E Dondero
(74) *Attorney, Agent, or Firm* — Fay Sharpe LLP

(57) ABSTRACT

A fixed or adjustable chain guide includes a captured shoulder bolt fastener. An adjustable chain guide such as a chain tensioner arm assembly includes a tensioner arm with a pivot bore defined about a pivot axis. The pivot bore includes an inner end opening through a rear face of the tensioner arm and an outer end opening through a front face of the tensioner arm. The tensioner arm further includes at least one resilient fastener retaining tab located adjacent the pivot bore. The shoulder bolt extends through the pivot bore and is engaged by the at least one resilient fastener retaining tab, and the at least one fastener retaining tab inhibits separation of the fastener from the tensioner arm. The fastener preferably includes an annular groove or other recess to be engaged by the one or more fastener retaining tabs in order to permit the tensioner arm to rotate relative to the fastener. New shoulder bolt fasteners are also defined, each including a shoulder region having at least one retaining feature such as an annular groove adapted to be engaged by a projecting portion of an associated component for axially capturing the fastener to the associated component while permitting rotation of the associated component relative to the fastener.

6 Claims, 15 Drawing Sheets

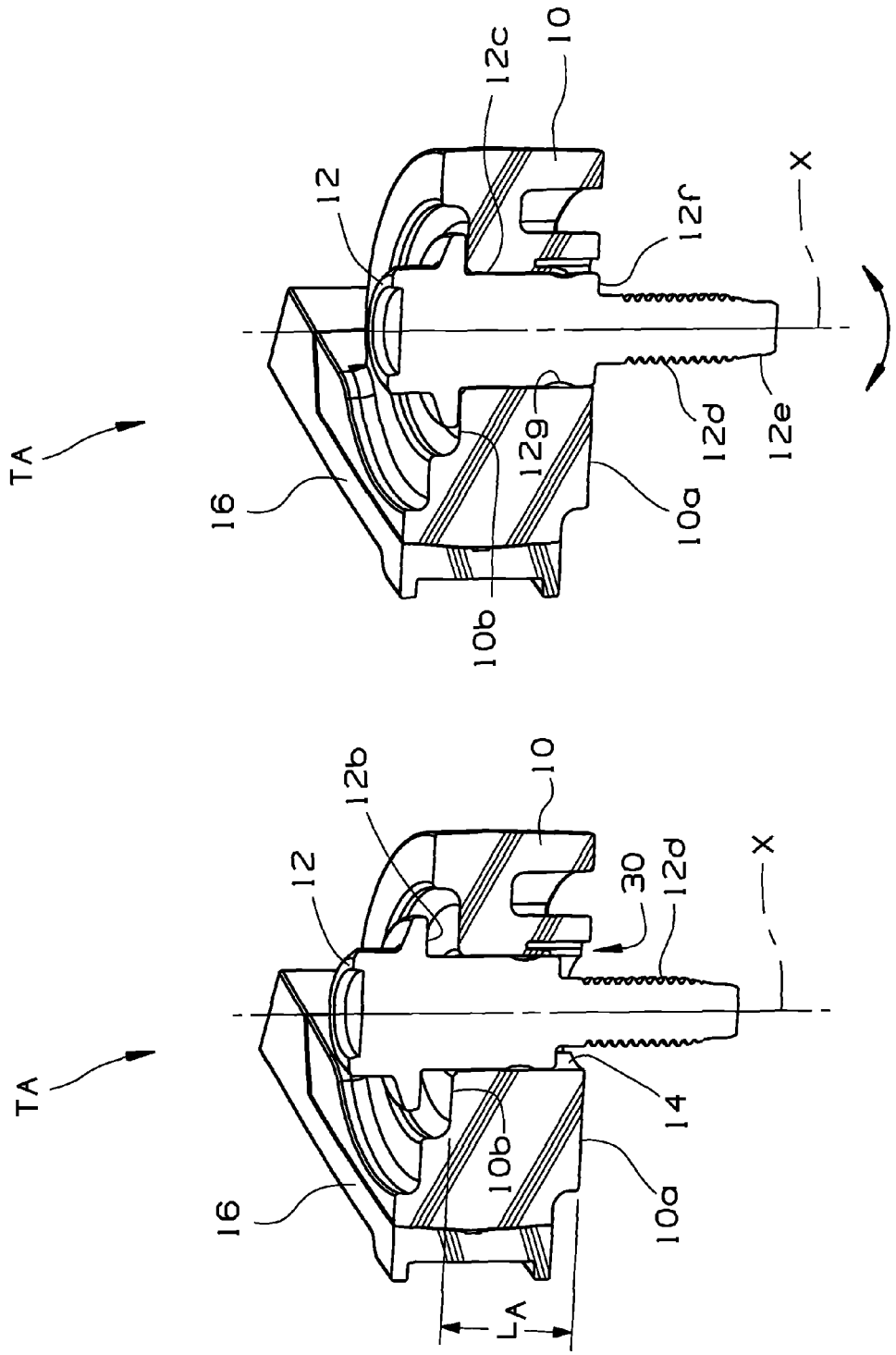

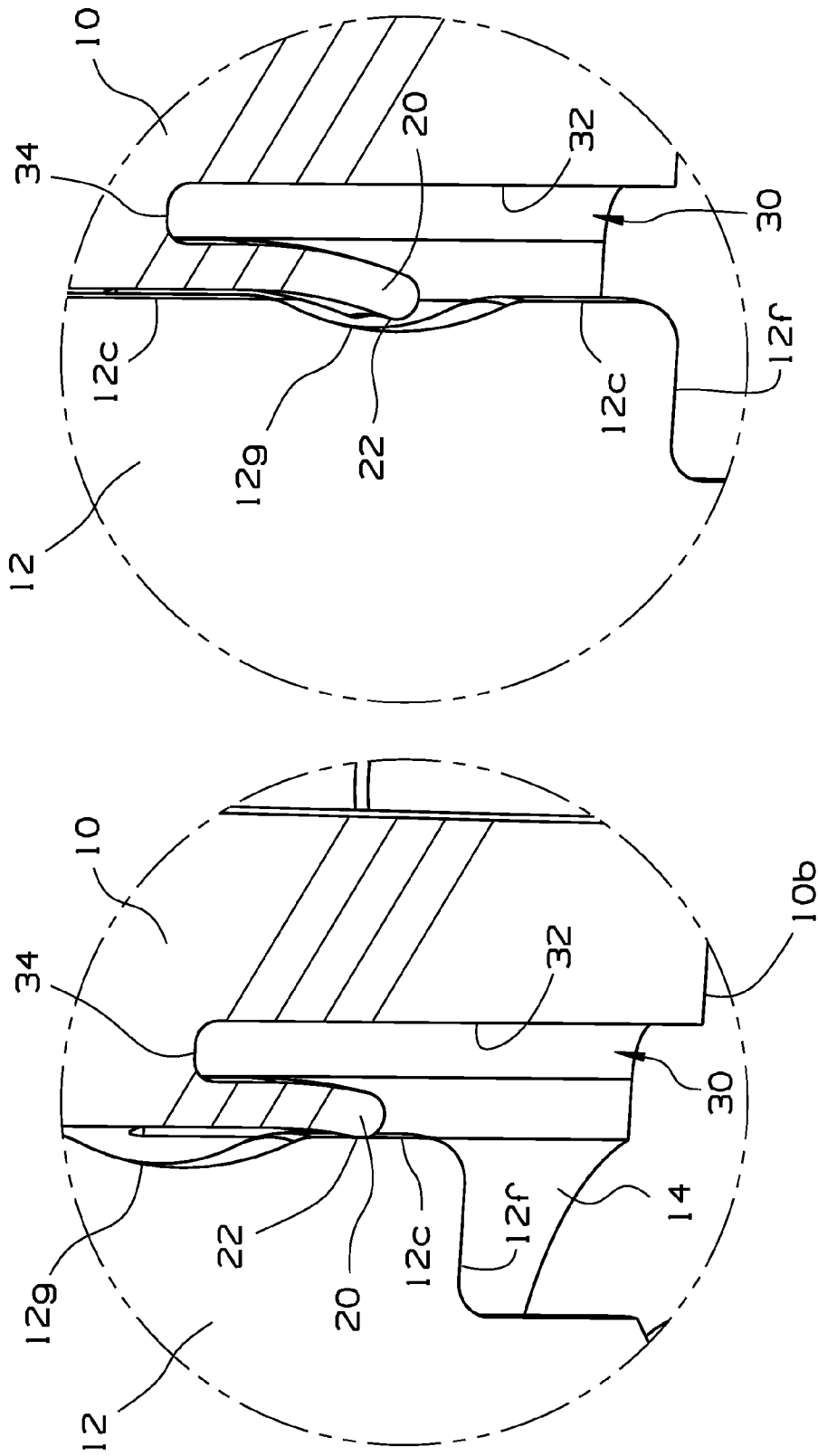

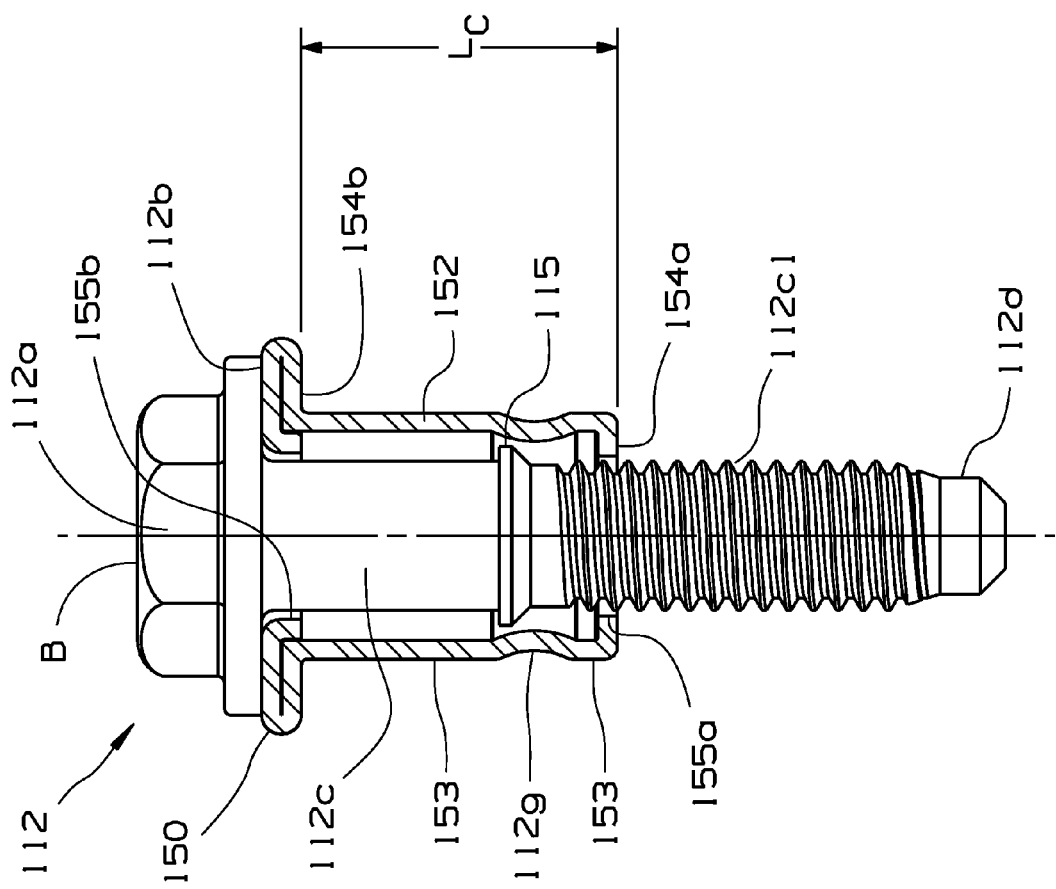

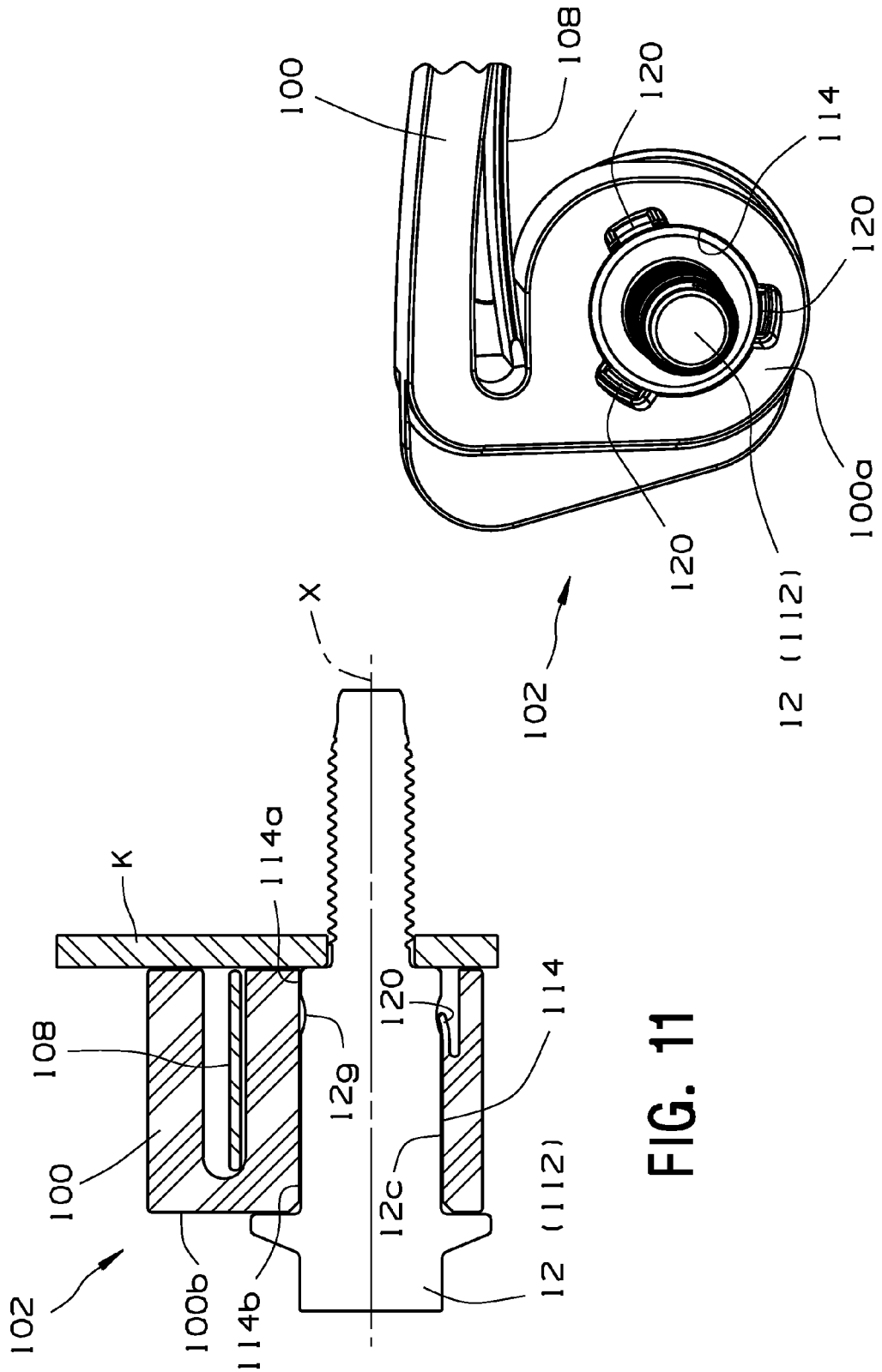

CAPTIVE FASTENER APPARATUS FOR CHAIN GUIDE OR TENSIONER ARM

CROSS-REFERENCE TO RELATED APPLICATION

This application claims priority from and benefit of the filing date of U.S. provisional application Ser. No. 61/019,693 filed Jan. 8, 2008, and said prior provisional application Ser. No. 61/019,693 is hereby expressly incorporated by reference into the present application.

BACKGROUND

The use of captured fasteners is known to increase productivity by reducing assembly time during the manufacturing process, for example, when fastening fixed chain guides to an engine block. The time savings is achieved by pre-attaching the fastener(s) to the chain guide or tensioner arm to be later assembled and secured to an engine block, either manually or by the use of robotics. In the absence of sufficient and purposeful external forces, the fastener capturing arrangement serves to retain the fastener in a desired axial position within the bore. Once the fastener has been installed and axially retained to a chain guide or tensioner arm, the assembly can then be shipped or otherwise transported for later attachment to an engine block. Although its primary purpose is to retain the fastener during handling and shipping, the captive fastener arrangement must also allow for selective translational (axial) and rotational movement of the fastener within the bore as would occur during the bolt tightening procedure for securing the assembly to the engine block. And in the specific case of a tensioner arm for an automotive engine camshaft drive, the fastener retaining device must not inhibit free rotation of the tensioner arm about its fixing point during engine operation as required for chain tensioning.

U.S. Pat. Re. 36,164 (reissue of U.S. Pat. No. 5,395,194) discloses a bolt retaining apparatus that includes a separate component made from a resilient polymeric material and it is used extensively in many automotive engine applications to retain standard bolts. This prior art device will not permit proper functionality for many shoulder bolt fixing arrangements, however, and it also has the limitation of requiring the retaining device itself to be pre-assembled, thereby limiting overall savings to assembly time and cost.

It is therefore desirable to provide an improved cost-effective fastener retaining apparatus for shoulder bolt applications that integrates retention features to chain guide or chain tensioner arm components in order to increase manufacturing productivity for the installation of nylon chain guide brackets and tensioner arms used in many automotive engines.

SUMMARY

In accordance with one aspect of the present development, a chain tensioner arm assembly includes a tensioner arm including a pivot bore defined about a pivot axis. The pivot bore includes an inner end opening through a rear face of the tensioner arm and an outer end opening through a front face of the tensioner arm. The tensioner arm further includes at least one resilient fastener retaining tab located adjacent the pivot bore. A fastener extends through the pivot bore and is engaged by the at least one resilient fastener retaining tab, wherein the fastener retaining tab inhibits separation of the fastener from the tensioner arm.

In accordance with another aspect of the present development, a chain tensioner assembly includes a tensioner arm including a bore, the bore having an inner end opening through a rear face of the tensioner arm and an outer end opening through a front face of the tensioner arm. The tensioner arm includes a projecting portion that extends into and restricts a diameter of the bore. A fastener extends through the bore and is engaged with said projecting portion such that the projecting portion captures the fastener in the bore while allowing rotation of the tensioner arm relative to the fastener.

In accordance with a further aspect of the present development, a chain guide assembly includes a chain guide comprising a bore. The chain guide includes one or more projections that extend into the bore. A fastener extends through the bore and is axially captured in the bore by engagement between the fastener and the one or more projections.

In accordance with another aspect of the present development, a fastener comprises a threaded portion, a driving head connected to the threaded portion, and a shoulder region between said driving head and said threaded portion. The shoulder region comprises an outer surface including at least one retaining feature adapted to be engaged by a projecting portion of an associated component.

In accordance with another aspect of the present development, a pivoting or fixed chain guide comprises an arm including a bore defined about an axis by a cylindrical bore wall. The bore includes an inner end opening through a rear face of the arm and an outer end opening through a front face of the arm. The arm further includes at least one resilient fastener retaining tab located in the bore between the inner and outer ends. The at least one resilient fastener retaining tab partially restricts a diameter defined by the cylindrical bore wall when in a free state and is selectively resiliently deflectable radially outward relative to the axis to accommodate insertion of an associated fastener into the bore.

BRIEF DESCRIPTION OF DRAWINGS

FIGS. 6, 6A and 6B progressively show the fastener of FIG. 1 being assembled to the tensioner arm of FIG. 1;

FIG. 7A is a greatly enlarged partial detail view of FIG. 6A;

FIG. 7B is a greatly enlarged partial detail view of FIG. 6B;

FIG. 8 shows a multi-piece shoulder bolt fastener defined in accordance with one aspect of the present development, with a sleeve of the fastener sectioned to reveal internal features of the fastener;

FIG. 11 is a section view as taken at view line 11-11 of FIG. 10;

FIG. 12 is a partial rear view of the tensioner arm portion of the tensioner arm assembly of FIG. 10.

DETAILED DESCRIPTION OF THE INVENTION

The present invention relates generally to a captive or retained shoulder bolt fastener used in automotive engine applications and, more particularly, to an apparatus or device in which fastener retaining features are formed integral to a nylon or other polymeric chain guide or tensioner arm. The shoulder bolt preferably includes a retaining feature that interacts with the retaining feature of the chain guide or tensioner arm.

Figure 1:
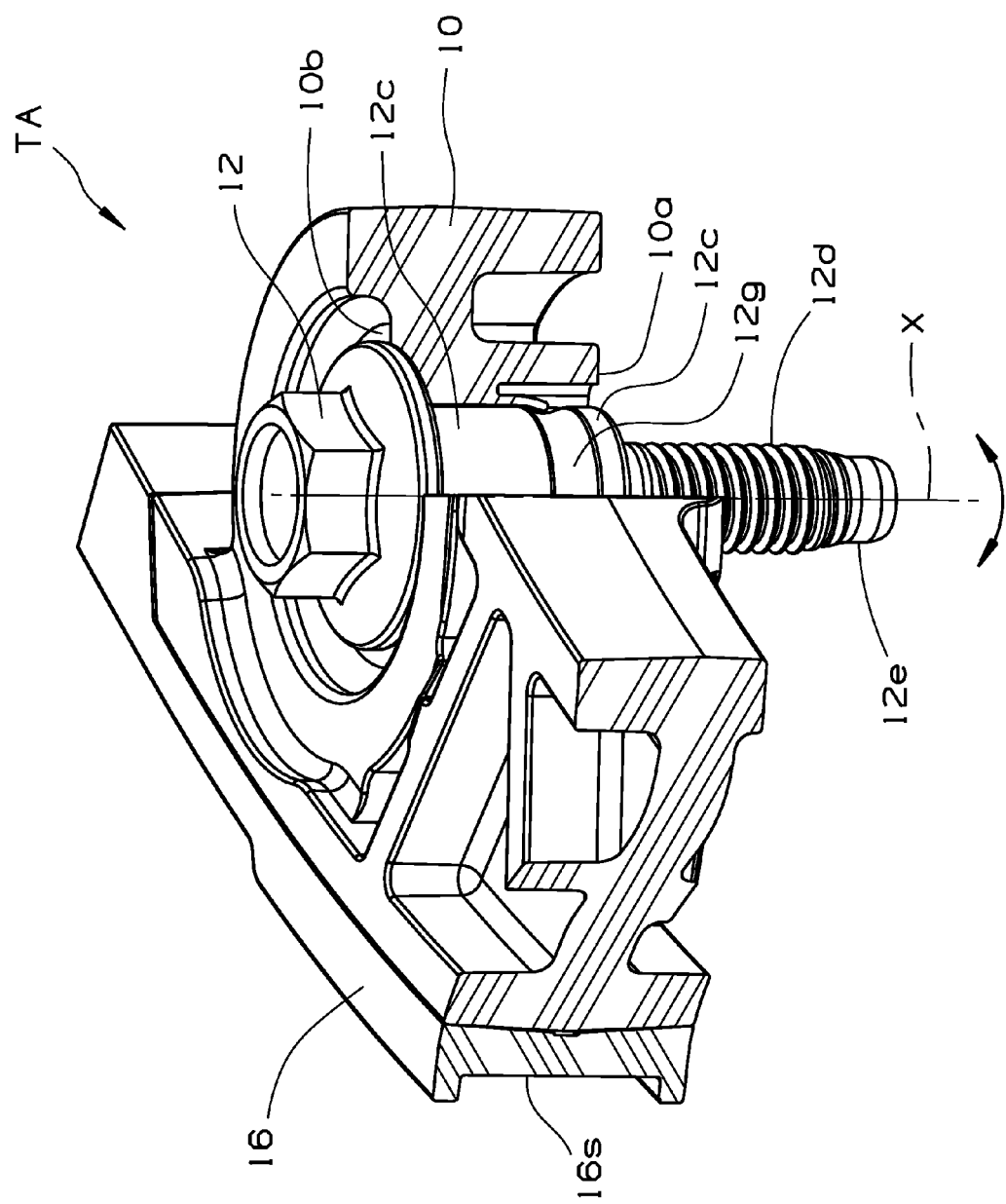
FIG. 1 is a partial isometric view, partially cut away, of a tensioner arm assembly in accordance with the present development.
Figure 2:
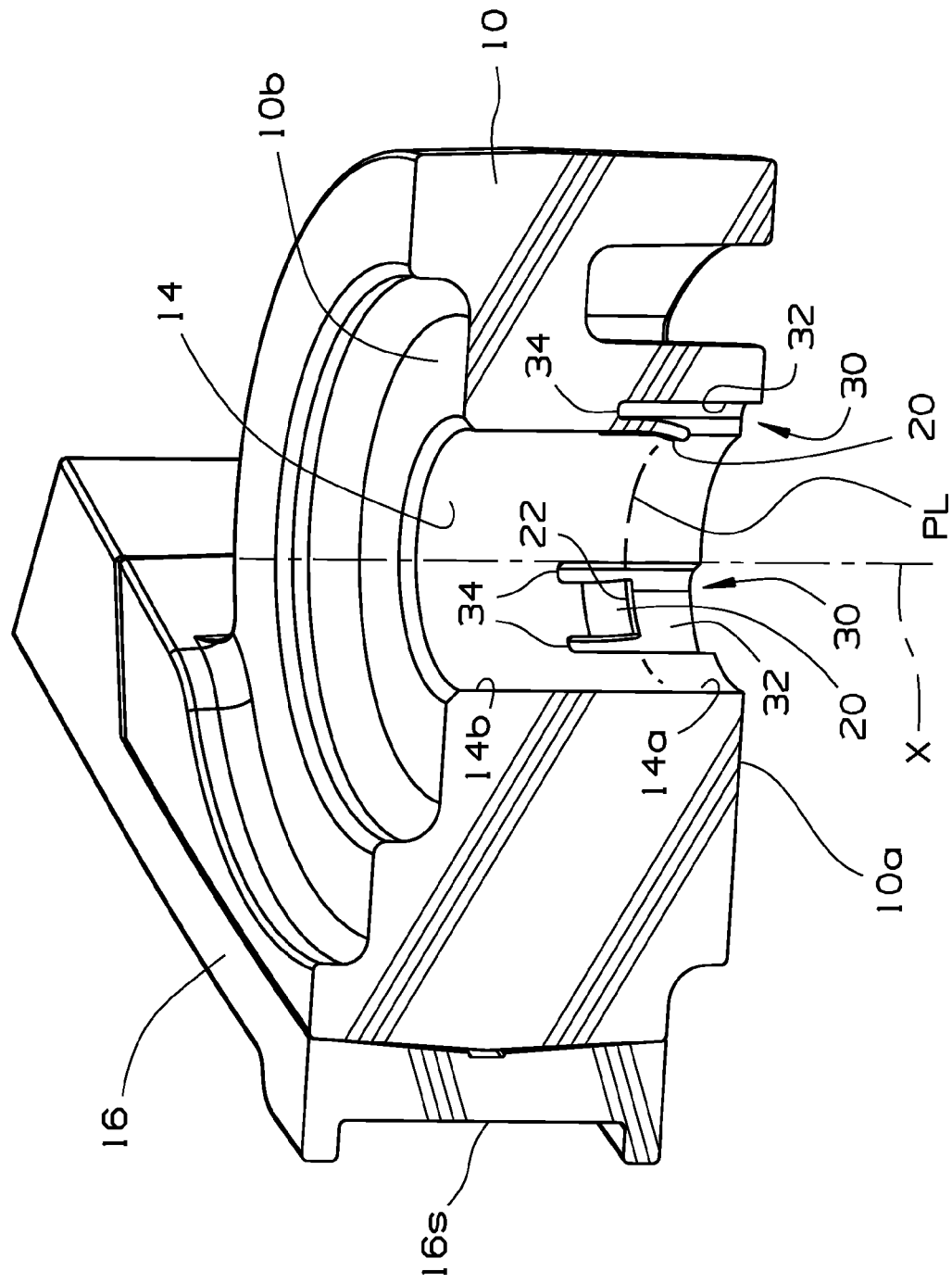
FIG. 2 is a section view of the tensioner arm of FIG. 1.
Figure 10:
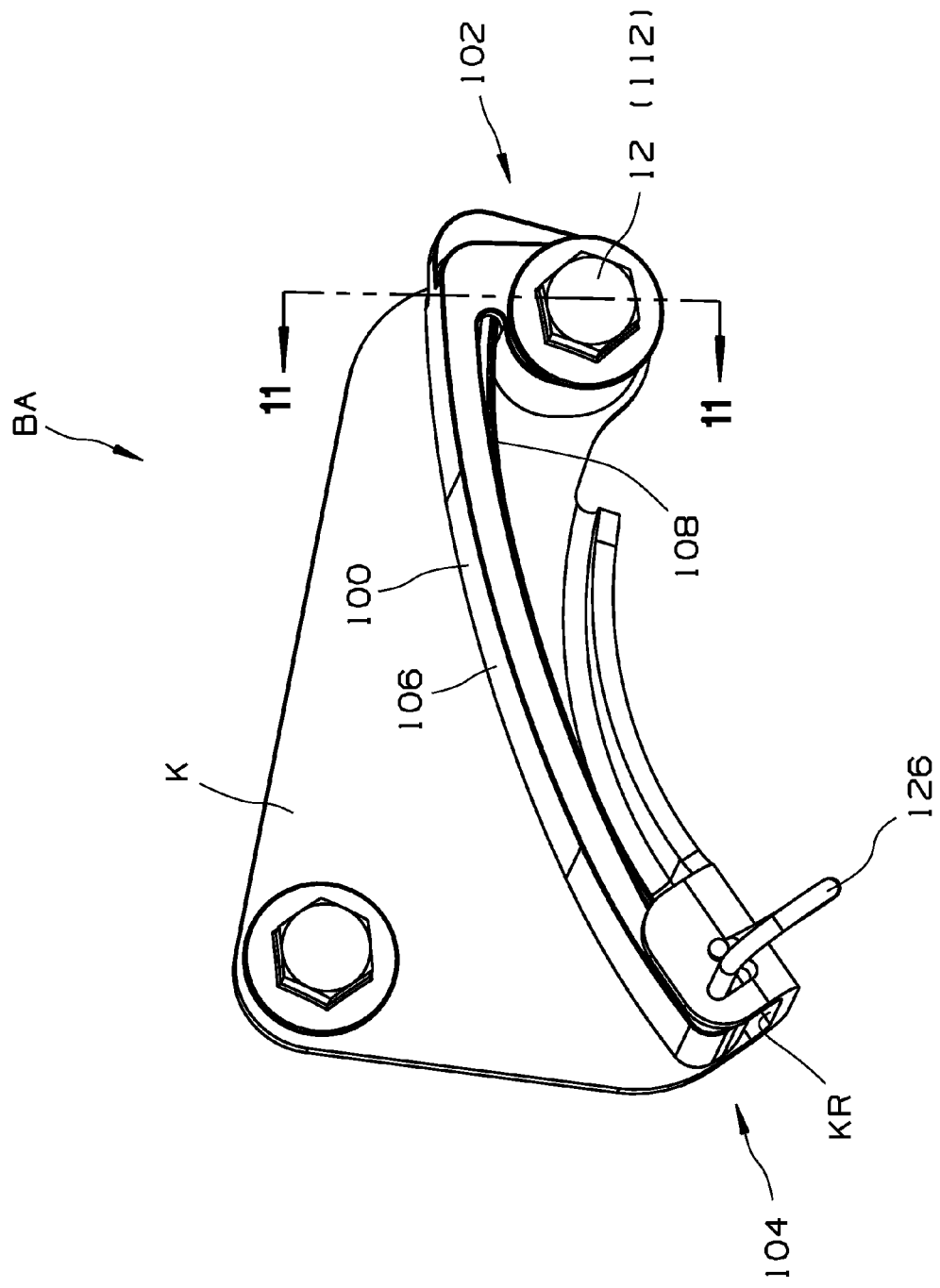
FIG. 10 is an isometric view of another alternative embodiment of a tensioner arm assembly formed in accordance with the present development, wherein the tensioner arm assembly is a blade-type tensioner assembly including a mounting bracket.

FIG. 1 illustrates a chain tensioner arm 10 including a chain guide member 16 connected thereto, and a fastener such as a shoulder bolt 12 engaged therewith to define a tensioner arm assembly TA. In FIG. 1, a portion of the tensioner arm 10 is broken away to reveal its engagement with the shoulder bolt 12. The shoulder bolt 12 or other fastener is used to secure the tensioner arm 10 to an engine block (not shown) while allowing pivoting or rotational movement of the tensioner arm about a pivot axis X. With reference also to FIG. 2, which is a section view of the tensioner arm 10, the shoulder bolt 12 is received in a cylindrical pivot bore 14 defined about and centered on the pivot axis X. The tensioner arm 10 could also be a non-pivoting or "fixed" chain guide, in which case the shoulder bolt 12 (usually with at least one other fastener) immovably secures the chain guide to the engine block. For convenience, the present invention is described herein with reference to a pivoting chain tensioner arm 10, which can generally also be referred to as an adjustable chain guide. In either case, the tensioner arm or chain guide is defined as a one-piece construction by injection molding or other means using a polymer such as Nylon that can be unfilled or filled (e.g., glass-filled). As shown, a separate unfilled polymeric chain guide/slide member or "shoe" 16 is connected to the tensioner arm 10 and includes a working surface 16s on which a chain slides during operation of an engine to which the tensioner arm assembly TA is operatively connected (alternatively, the working surface 16s can be defined as part of a one-piece tensioner arm 10). A rear face 10a of the tensioner arm 10 is adapted to be abutted with or otherwise lie adjacent an engine block or other mounting location (e.g., a bracket K as shown in FIG. 10), while the front face 10b is adapted to face outwardly away from the engine block or other mounting location when the tensioner arm is installed.

Figure 3:
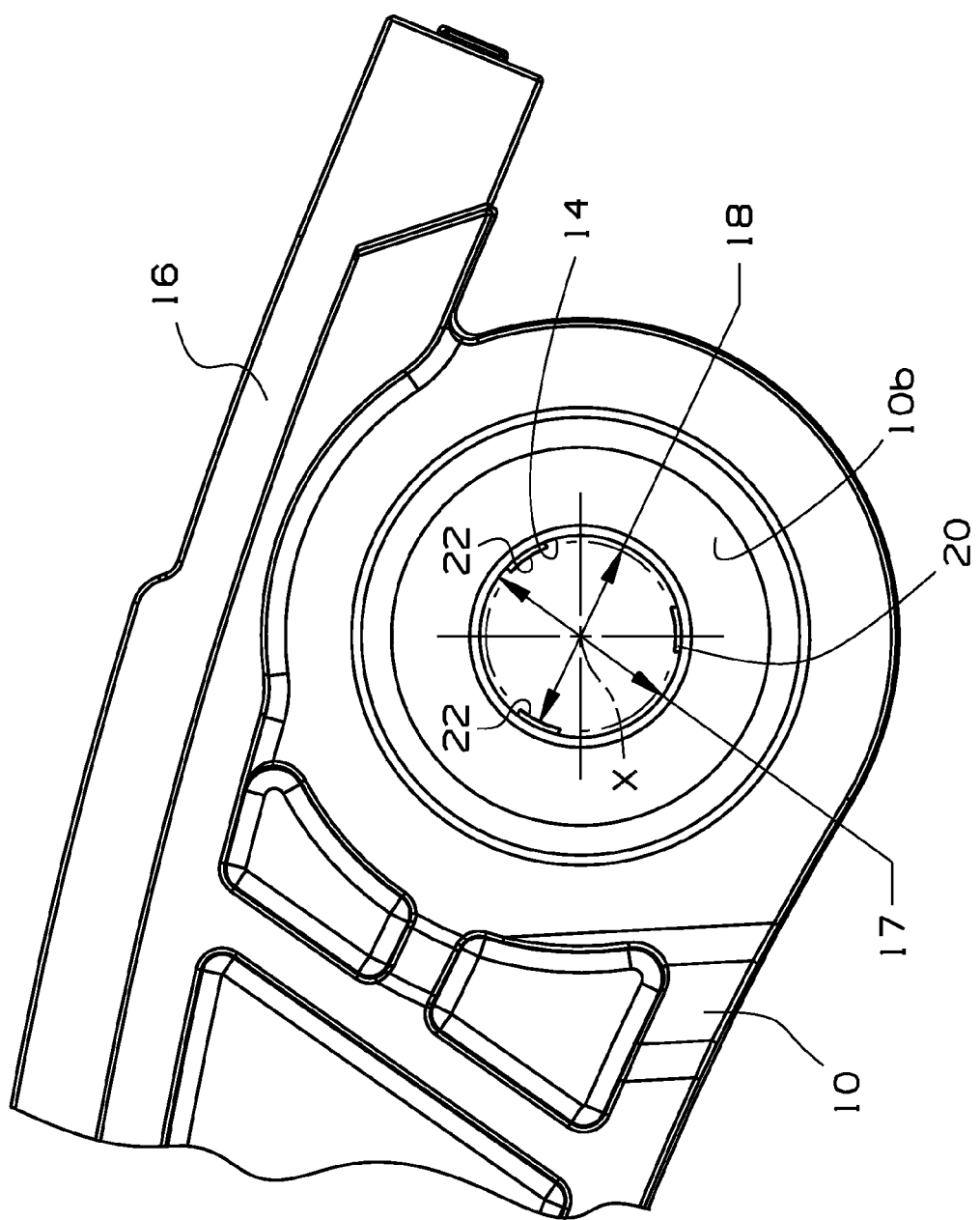
FIGS. 3 and 4 are partial front and rear views, respectively, of the tensioner arm of FIG. 1.
Figure 4:
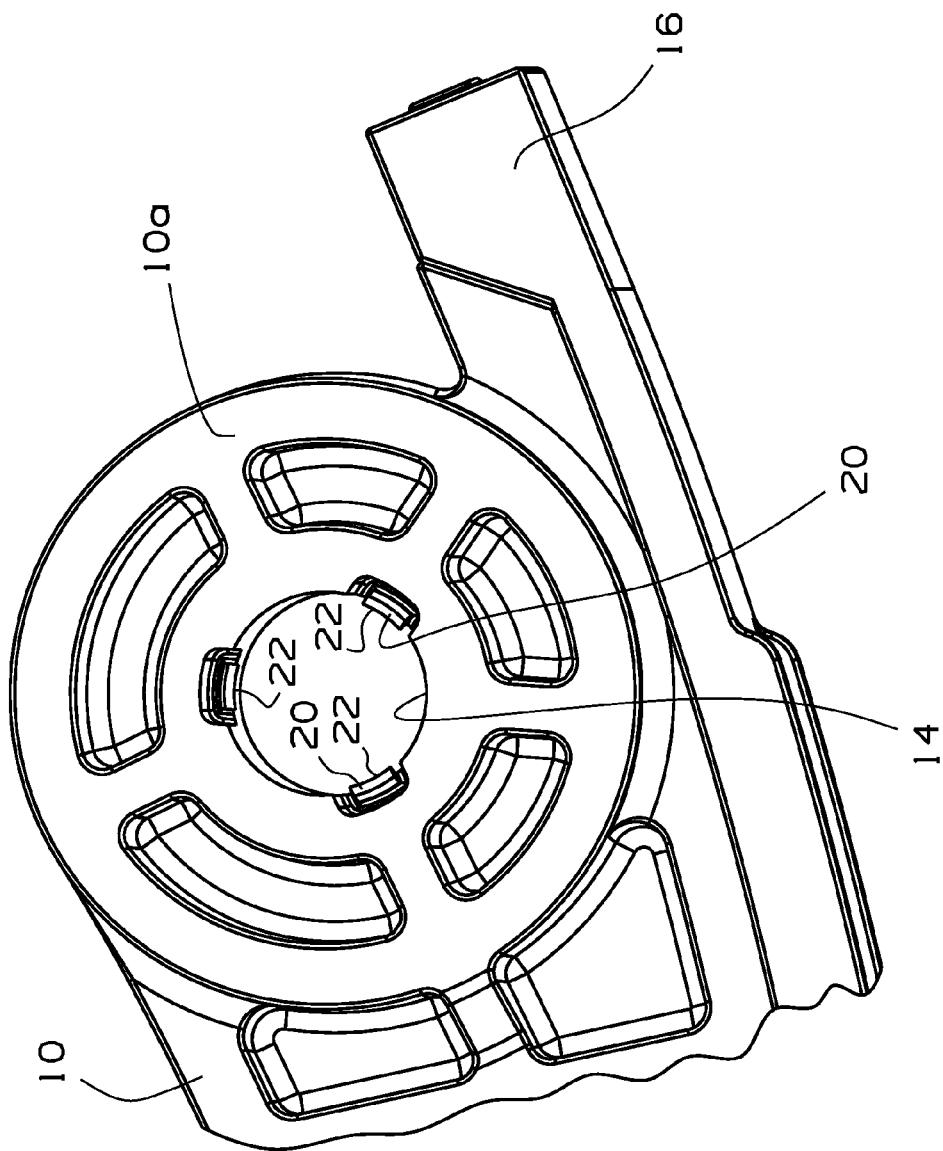

FIGS. 3 and 4 are, respectively, partial front and rear views of the tensioner arm 10. It can be seen with reference to FIGS. 2-4, that the pivot bore 14 defines a cylindrical bore diameter 17 centered on a pivot axis X about which the tensioner arm 10 pivots during use. The bore 14 as defined by its cylindrical bore wall extends between an inner end 14a adjacent and opening through the rear face 10a and an outer end 14b adjacent and opening through the front face 10b of the tensioner arm.

At least one, and preferably two or more fastener retaining tabs 20 or other projections are located in or adjacent the pivot bore 14 and restrict the bore 14. Each tab 20 includes a tip 22 that projects radially into or otherwise partially occludes or restricts the bore 14. The fastener retaining tabs 20 thus define a restricted diameter portion of the pivot bore 14. Preferably, the fastener retaining tabs 20 are identical to each other and symmetrically located circumferentially about the pivot axis X so that their tips 22 define a tab diameter 18 (FIG. 3) that is concentric with and smaller than the bore diameter 17. It is preferred that the tab diameter 18 be centered on the pivot axis X to ensure substantially equal tab deflection during fastener 12 insertion.

Figure 5:
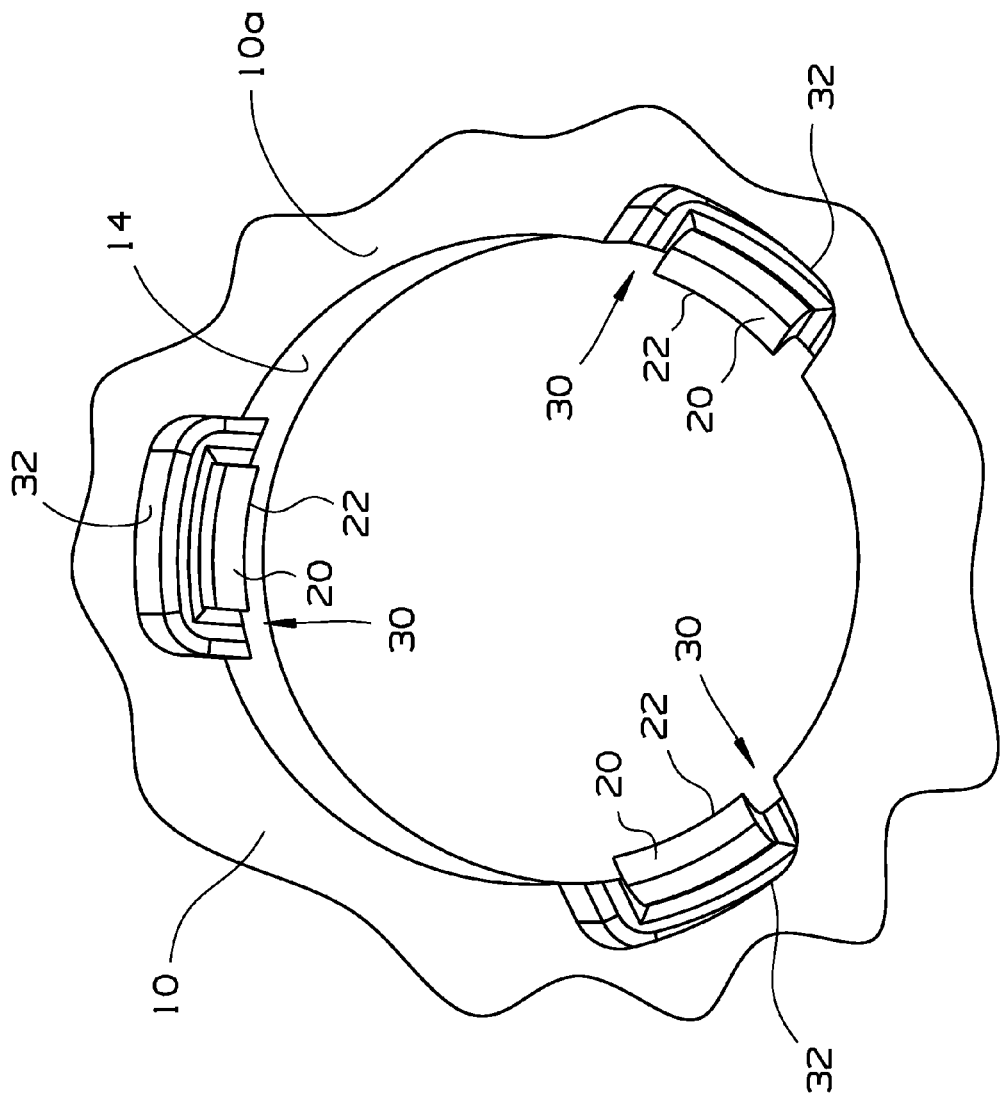
FIG. 5 is a greatly enlarged partial detail view of FIG. 4.

FIG. 5 is a greatly enlarged version of FIG. 4 showing the rear face 10a of the tensioner arm 10. It can be seen in FIGS. 2 and 5 that each fastener retaining tab 20 is located in a pocket 30 (see also greatly enlarged detail views in FIGS. 7A and 7B). Each pocket 30 opens into or through the pivot bore diameter 17 and extends from the inner end 14a of the pivot bore 14 to a location about mid-way between the inner and outer ends 14a,14b of the pivot bore. Each pocket 30 thus includes an axially extending outer wall 32 (which can be defined as a single smoothly curved wall or as a multi-faced construction) and a transverse end wall 34. Each tab 20 extends axially from the pocket end wall 34 toward the inner end 14a of the bore 14 and terminates in the tip 22 which, as noted above, projects radially into the bore 14. Because each tab 20 is defined as part of the one-piece molded construction of the tensioner arm 10, and because each tab 20 is spaced from its surrounding pocket 30, each tab 20 is resiliently deflectable toward the pocket outer wall 32 during fastener 12 insertion, i.e., radially outward with respect to the pivot bore 14.

Figure 6:
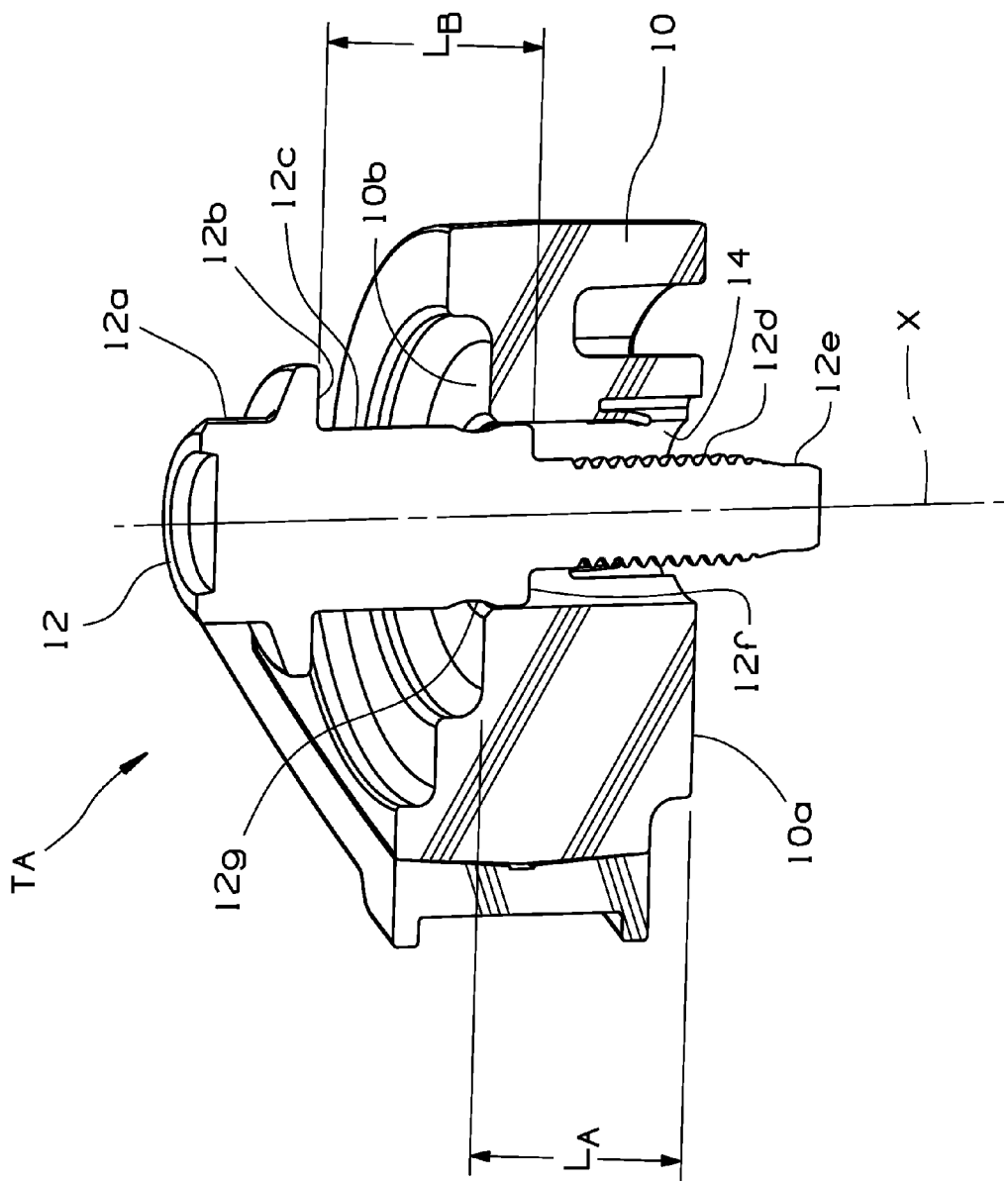

The structure of the shoulder bolt 12 and operation of the present invention are described with reference to FIGS. 6, 6A, 6B (and the enlarged detail views provided by FIGS. 7A and 7B) which sequentially illustrate connection of the fastener 12 to the tensioner arm 10 to construct the tensioner arm assembly TA. Except as otherwise shown and/or described, the fastener 12 is a conventional metal (e.g., cold-headed) one-piece shoulder bolt. As such, the fastener includes a head 12a, a flange 12b, an unthreaded cylindrical shoulder or shoulder region 12c, and a threaded shank 12d having a tip 12e. A step 12f is defined between the shoulder region 12c and the threaded shank 12d. The diameter of the shoulder region 12c is such as to be closely but rotatably received in the pivot bore 14 of the tensioner arm 10. As shown in FIG. 6, the pivot bore 14 of the tensioner arm 10 defines a length $L_A$ that is slightly (e.g., 0.1 to 0.5 mm) less than the axial length $L_B$ of the shoulder region 12c (between the flange 12b and step 12f) so that when the shoulder bolt 12 is fully inserted into the pivot bore 14 with the flange 12b abutted with the tensioner arm 10 (FIG. 6B) and the assembly TA is threadably connected to an engine block using the fastener 12, the step 12f will project slightly from the inner end 14a of the bore 14 and engage the engine block to which the assembly TA is connected to provide a stand-off that will allow the tensioner arm 10 to rotate freely on the shoulder region 12c of the fastener.

As best seen in FIG. 6 and the enlarged detail views of FIGS. 7A and 7B, unlike a conventional shoulder bolt, the shoulder region 12c of the fastener 12 includes a retaining feature for engaging and/or being engaged by each of the fastener retaining tabs 20. In the illustrated embodiment, the retaining feature of the fastener 12 comprises an annular groove or other recess 12g defined in and extending uninterrupted and completely around the outside diameter of the shoulder region 12c at an axial location corresponding to the axial location of the tips 22 of the fastener retaining tabs 20. When the fastener 12 is progressively inserted into the tensioner arm pivot bore 14 as shown in FIG. 6A, the shoulder region 12c deflects the retaining tabs 20 outwardly to allow passage of the shoulder region 12c into the pivot bore 14 (see also FIG. 7A). Upon further sliding insertion of the fastener 12 into the bore as shown in FIG. 6B, the retaining tab tips 22 become aligned with the annular groove 12g, and the retaining tabs 20 move at least partially resiliently back toward their free or relaxed position so that the retaining tab tips 22 extend into and/or become seated in the annular groove 12g (see also FIG. 7B which shows an enlarged detail of FIG. 6B).

The flange 12b defines a stop that limits insertion depth of the fastener 12 in the pivot bore 14 to a depth that ensures alignment of the retaining tab tips 22 and the annular groove 12g. Reverse axial movement of the fastener 12 from the pivot bore 14 is inhibited by the mating of the retaining tab tips 22 in the groove 12g, so that the fastener 12 is captured to the tensioner arm 10 to define the assembly TA. As noted, the fastener 12 is rotatable in the tensioner arm bore 14, and the tabs 20 do not meaningfully impede such rotation. Those of ordinary skill in the art will recognize the term "captured" as used herein means that the fastener 12 is engaged with the tensioner arm 10 in a manner that prevents unintended separation of the fastener from the tensioner arm during shipping and/or handling of the assembly TA, but that allows the fastener 12 to be intentionally removed from the pivot bore 14 by use of sufficient axial pull-out or push-out force.

Figure 8A:
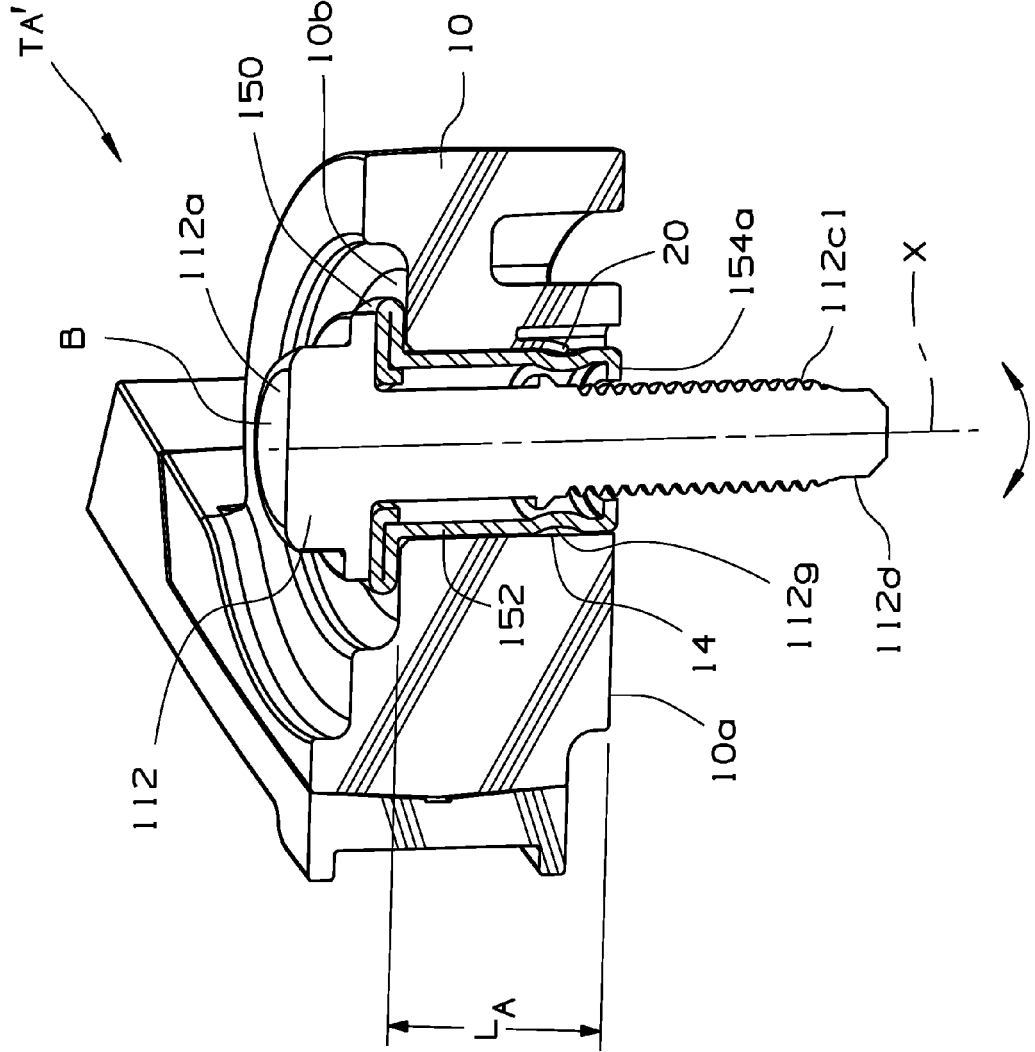
FIGS. 8A and 8B are section views of the tensioner arm of FIGS. 1-5 and the alternative fastener of FIG. 8 assembled therewith to define an alternative tensioner arm assembly in accordance with the present development.
Figure 8B:
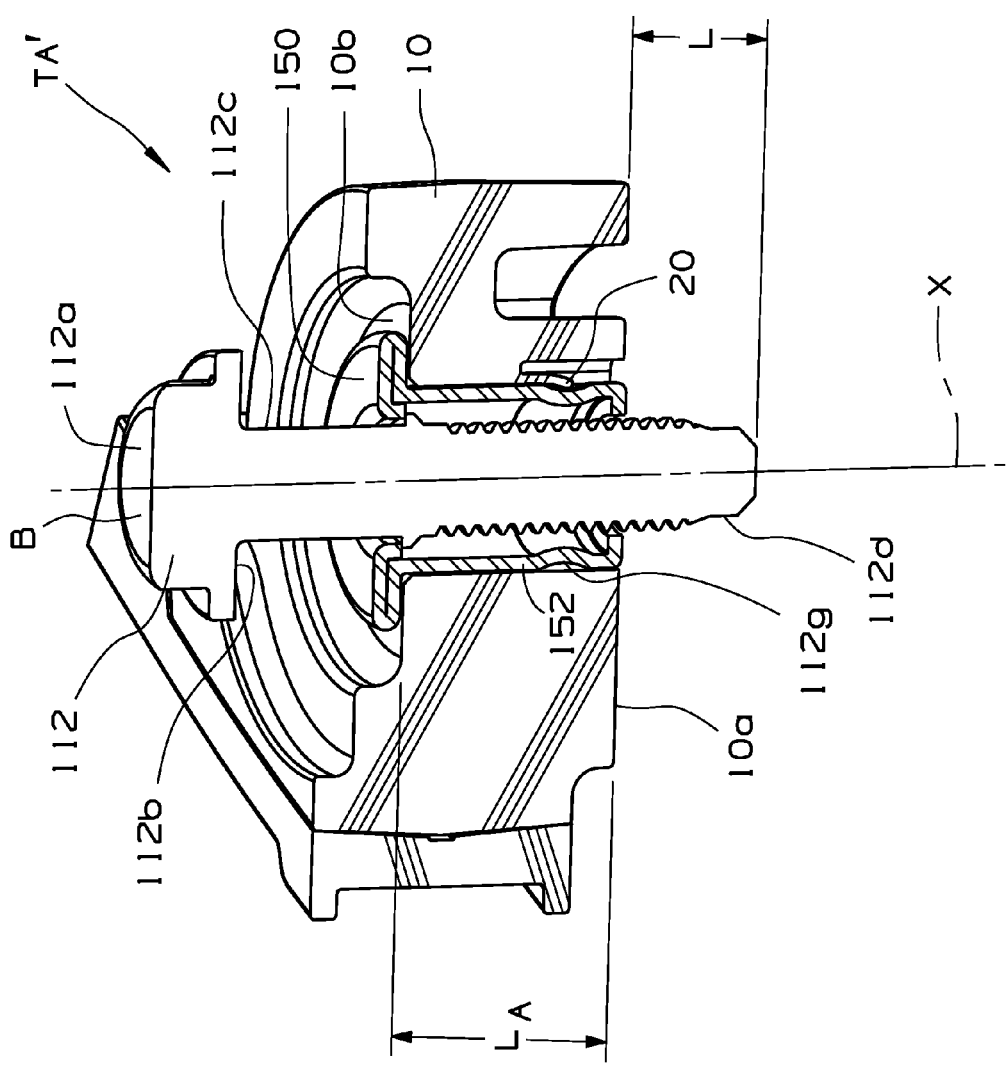

FIGS. 8A and 8B illustrate an alternative embodiment of the assembly TA' that is identical to the assembly TA, except that a different fastener 112 is used. The fastener 112 is a multi-piece shoulder bolt and is shown by itself in FIG. 8. The shoulder bolt fastener 112 comprises a bolt B having a head 112a, a flange 112b, and a shank 112c that extends from the head and flange entirely to the tip 112d. At least an end or distal portion 112c1 of the shank is threaded so as to be adapted for advancement into a tapped bore of an engine block or the like to operatively install the assembly TA'. A sleeve 150 surrounds an axial length of the shank 112c and defines a shoulder or shoulder region for the fastener 112.

Specifically, as best seen in FIG. 8, the sleeve 150 is defined by a metal stamping or the like and includes a cylindrical body 152 of shorter axial length than the fastener shank 112c that is coaxially located on the shank 112c. The sleeve body 152 includes a cylindrical outer shoulder surface that defines a shoulder or shoulder region 153 that is closely but rotatably received in the tensioner arm pivot bore 14. The sleeve 150 includes an inner flange 154a which, in the illustrated embodiment, is defined by a turned-in end portion at an inner end of the sleeve body 152. The sleeve 150 also includes an outer flange 154b which, in the illustrated embodiment, is defined by a turned-out end portion at an outer end of the sleeve body 152. The outer flange 154b is larger than the diameter of the tensioner arm pivot bore 14. The inner and outer flanges 154a,154b of the sleeve 150 define respective apertures 155a,155b that center the fastener shank 112c in the sleeve 150 and that allow the shank 112c to slide axially relative to the sleeve 150. The shank 112c includes a radially enlarged ring or other protrusion 115 located between the sleeve inner and outer flanges 154a,154b and that cannot fit through either flange aperture 155a,155b, so that the sleeve 150 is captured on the shank 112c. As such, as shown in FIGS. 8A and 8B, when the fastener 112 is connected to the tensioner arm 10, the bolt portion B can move axially relative to the sleeve 150 between the two extreme positions shown in FIGS. 8A and 8B, but the bolt B cannot be separated from the sleeve 150.

Figure 8C:
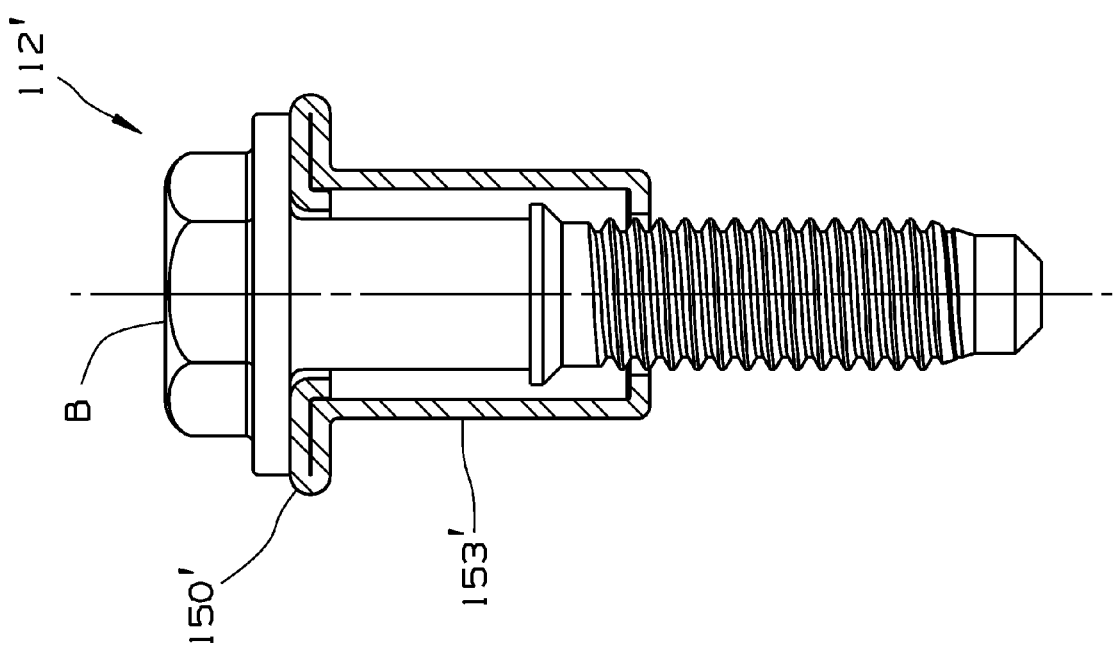
FIG. 8C is similar to FIG. 8 but shows a prior art multi-piece shoulder bolt fastener.

FIG. 8C shows a conventional multi-piece shoulder bolt fastener 112' that is, except as otherwise described or shown herein, identical to the new multi-piece shoulder bolt fastener 112 shown in FIG. 8. As such, identical components relative to the new fastener 112 are identified with identical reference characters/numbers, while corresponding but non-identical components are identified with like reference characters/numbers including a primed (') designation. Because a tensioner arm 10 must be rotatable when the assembly TA' is installed to an engine, the conventional multi-piece shoulder bolt 112' of FIG. 8C is not preferred for use to define a captured fastener tensioner arm assembly TA' in accordance with the present development because the conventional multi-piece shoulder bolt 112' does not include any structure on its shoulder 153' as defined by its sleeve 150' that allows it to be captured to the tensioner arm 10 while also permitting rotation of the tensioner arm.

Referring again specifically to FIGS. 8, 8A, 8B, unlike the conventional fastener 112', the cylindrical outer surface or shoulder 153 of the new fastener 112 includes an annular groove 112g or other indentation or recess(es) or other retaining feature(s) that is (are) located and adapted to receive the tips 22 of the fastener retaining tabs 20 when the sleeve 150 of the fastener 112 is fully inserted into the tensioner arm bore 14 as shown in FIGS. 8A and 8B. A main advantage of the arrangement shown in FIGS. 8A and 8B is that the bolt B is captured to the tensioner arm 10 but can be pushed back to the position shown in FIG. 8B where only a short length L of the bolt B projects from the rear face 10a of the tensioner arm, which is preferred to facilitate installation of the final assembly TA' to an engine block. Also, fastener assembly 112,112' will provide increased bolt stretch as compared to the conventional shoulder bolt 12. Here, again, the shoulder 153 has an axial length $L_C$ (FIG. 8) to provide a stand-off for the tensioner arm 10 when the final assembly TA' is installed.

Figures 9, 9A:
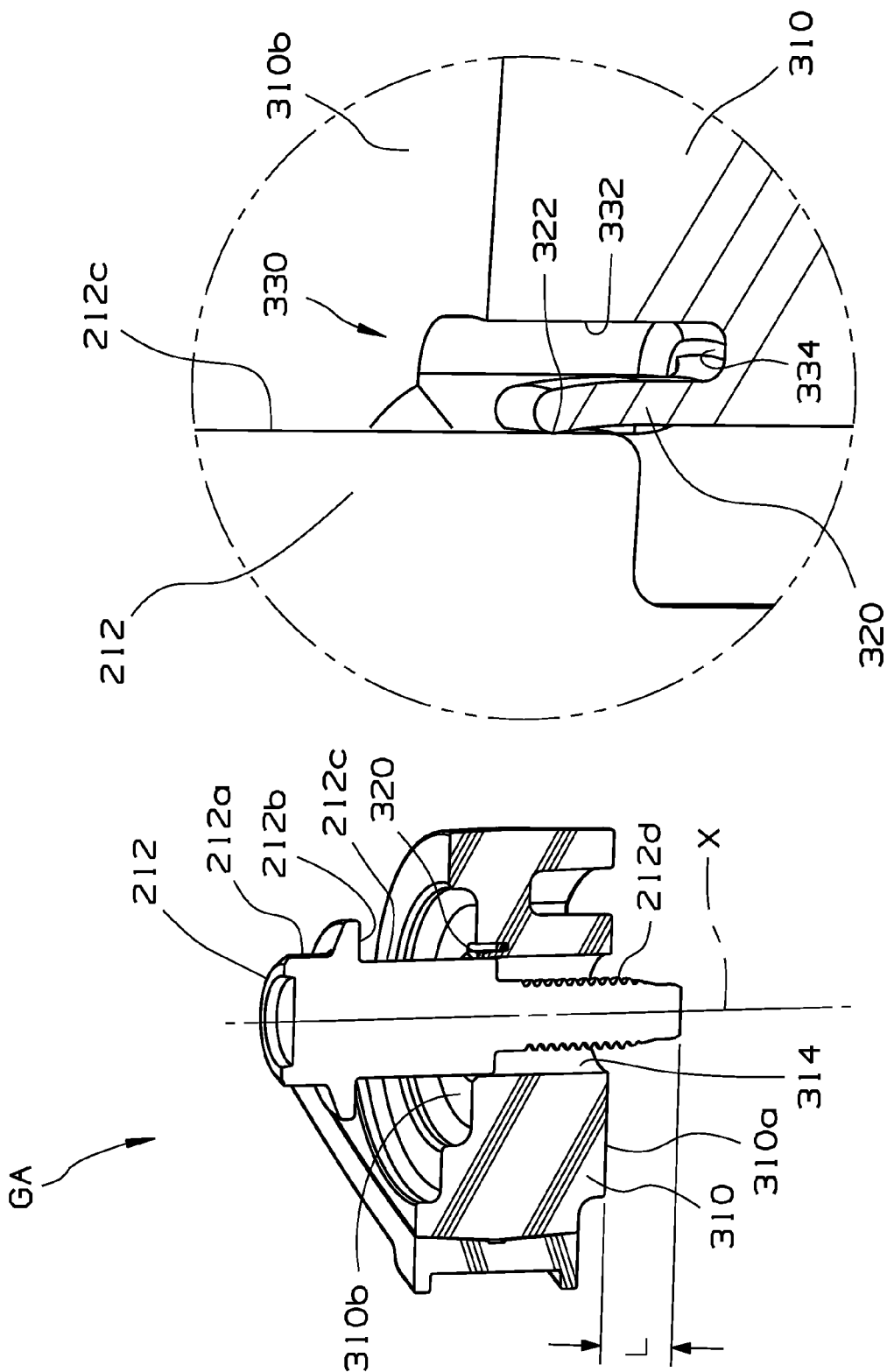
FIG. 9 illustrates another alternative embodiment of a fixed chain guide assembly formed in accordance with the present development.
FIG. 9A is a greatly enlarged partial detail view of FIG. 9.

FIG. 9 and the enlarged detail view of FIG. 9A illustrate another alternative embodiment in accordance with the present development, wherein a fixed (non-rotatable) guide assembly GA uses at least one conventional shoulder bolt 212 (or the conventional multi-piece shoulder bolt 112' of FIG. 8C) for securing the guide arm or guide 310 to an associated engine structure. Typically, the fixed guide 310 will be secured to the engine structure using first and second spaced-apart shoulder bolts 212 (or 112'), but only part of the guide 310 and one bolt 212 are shown in FIG. 9. Like components of the guide 310 relative to the tensioner arm 10 are identified with like reference numbers that are 300 greater than those used for the tensioner arm 10. The shoulder bolt 212 is identical to the shoulder bolt 12 shown in FIG. 1, but does not include any axial retaining features such as the groove 12g. As such, the bolt 212 includes a head 212a, flange 212b, shoulder or shoulder region 212c, and threaded shank 212d. For the fixed guide 310 the fastener retaining tabs 320 in the mounting bore 314 (only one retaining tab 320 is visible in FIGS. 9 and 9A) are inverted and located so that the tips 322' thereof are as close as possible to the front face 310b of the guide 310. When the shoulder bolt 212 is inserted into the pivot bore 314 of the guide 310, the tips 322 of the fastener retaining tabs 320 are deflected outwardly and frictionally engage the shoulder region 212c of the shoulder bolt 212 so as to capture the bolt 212 to the guide 310. Those of ordinary skill in the art will recognize that the bolt 212 is frictionally captured to the guide 310 when it is fully inserted into the bore 314 (with its flange 212b in contact with the guide 310) and also when the bolt 212 is partially withdrawn from the pivot bore 314 as shown in FIG. 9 which, as noted above, facilitates installation of the assembly GA to an engine mounting location by minimizing the bolt projection distance L during installation. As noted, the guide 310 typically includes another mounting bore 314 for a second shoulder bolt 12,112'. Due to the constant frictional engagement between the tab(s) 320 and the shoulder 212c that would impede relative rotation, the structure of FIG. 9 is more suitable for fixed chain guide arrangements as shown.

With reference again to FIG. 2, the tensioner arm 10 is preferably injection molded as a one-piece construction. In one embodiment, the pivot bore 14 is defined by mating mold inserts that mate at a tool pin parting line PL, with a first mold insert forming an outer portion of the bore 14 between the parting line PL and the outer end 14b of the bore, and with a second mold insert forming an inner portion of the bore 14 between the parting line PL and the inner end 14a of the bore. The parting line is located to correspond with the tips 22 of the tabs 20, but portions of the second mold insert extend beyond the parting line to define the pockets 30 for the retaining tabs 20.

Another alternative chain tensioner assembly is shown in FIGS. 10, 11, and 12, wherein a blade-type tensioner assembly BA is illustrated. The blade-type tensioner assembly BA comprises an optional mounting bracket K and a blade-type tensioner arm 100 having a pivot end 102 pivotally connected to the bracket K by means of the shoulder bolt 12 (as shown) or a shoulder bolt 112. The blade-type tensioner arm 100 comprises a free end 104 supported on a ramp KR defined by the bracket K in response to chain forces exerted on a central portion 106 of the blade-type tensioner arm. A metal leaf spring 108 is connected to the blade-type tensioner arm 100 and extends between the pivot and free ends 102,104 and is in contact with an underside of the central portion 106. As the blade-type tensioner arm 100 lengthens and contracts in response to the chain forces exerted on the central portion 106, as counter-acted by the spring 108, the free end 104 reciprocates in a sliding manner on the ramp KR while the pivot end 102 pivots in a reciprocating manner about the shoulder bolt 12. The bracket K can be omitted, in which case the pivot end 102 of the blade-type tensioner arm 100 is secured directly to an engine block or other structure using the shoulder bolt 12 or 112, while the free end 104 is slidably engaged with a support surface or ramp defined by another engine structure.

With respect to the engagement between the shoulder bolt 12 (or 112) and the blade-type tensioner arm 100, the blade-type tensioner arm is identical to the tensioner arm 10, and like features relative to the tensioner arm 10 are identified with like reference numbers that are 100 greater than those used for tensioner arm 10. FIG. 11 is a section view as taken along line 11-11 of FIG. 10 and shows that the blade-type tensioner arm 100 includes a pivot bore 114 that defines a cylindrical bore diameter centered on a pivot axis X about which the tensioner arm 100 pivots during use. The bore 114 extends between an inner end 114a adjacent and opening through the rear face 100a of the tensioner arm 100 and an outer end 114b adjacent and opening through the front face 100b of the tensioner arm 100. At least one, and preferably two or more fastener retaining tabs 120 are located in the pivot bore 114 and the one or more tabs 120 engage and capture the shoulder bolt 12 (or 112) as described above. A removable pin 126 temporarily secures the tensioner arm 100 to the bracket K during shipping, handling and/or installation, and the pin 126 is removed for operation of the blade-type tensioner assembly BA.

The invention has been described with reference to preferred embodiments. Modifications and alterations will occur to those of ordinary skill in the art to which the invention pertains, and it is intended that the invention be construed as encompassing all such modifications and alterations.

The invention claimed is:

1. A pivoting chain tensioner arm assembly comprising:
   a one-piece molded polymeric tensioner arm comprising a cylindrical pivot bore defined by a cylindrical bore wall centered about a pivot axis about which said tensioner arm pivots during use, said cylindrical bore wall extending axially between and defining an inner end of said pivot bore that opens through a rear face of the tensioner arm and an outer end of said pivot bore that opens through a front face of the tensioner arm such that said cylindrical pivot bore extends between said rear face and said front face of said tensioner arm;
   said cylindrical bore wall comprising a plurality of pockets defined therein and that open radially through said cylindrical bore wall into said cylindrical pivot bore and that open through one of said rear and front faces of said tensioner arm, each said pocket comprising: (i) an outer wall that extends axially relative to said pivot axis; and, (ii) an end wall arranged transverse to said pivot axis;
   said tensioner arm further comprising a plurality of fastener retaining tabs, located respectively in said plurality of pockets, wherein each of said plurality of fastener retaining tabs extends axially from said transverse end wall of the respective pocket at a location spaced from said outer wall of the respective pocket so as to be spaced from said outer wall and selectively resiliently deflectable radially outward with respect to said pivot bore toward said outer wall, and wherein each of said plurality of fastener retaining tabs comprises a tip that projects radially inward relative to said cylindrical bore wall into said pivot bore;
   a shoulder bolt fastener extending through said pivot bore, said shoulder bolt fastener comprising a head, a flange, an unthreaded cylindrical shoulder region, and a threaded shank, said unthreaded cylindrical shoulder region closely received in said pivot bore and extending completely through said pivot bore when said flange of said fastener is abutted with said front face of said tensioner arm so that said tensioner arm is rotatable on said cylindrical shoulder region of said fastener about said pivot axis, wherein said unthreaded cylindrical shoulder region comprises a annular groove that extends completely circumferentially around said unthreaded cylindrical shoulder region, wherein the tip of each fastener retaining tab is located in said annular groove such that said plurality of fastener retaining tabs inhibit withdrawal of said shoulder bolt fastener from said pivot bore of said tensioner arm while said annular groove permits rotation of said tensioner arm relative to said unthreaded shoulder region of said shoulder bolt fastener when said tip of each fastener retaining tab is located in said annular groove.

2. The pivoting chain tensioner arm assembly as set forth in claim 1, wherein said fastener comprises a one-piece construction.

3. The pivoting chain tensioner arm assembly as set forth in claim 1, wherein said shoulder bolt fastener comprises a multi-piece assembly including a bolt and a sleeve through which said bolt extends and to which said bolt is captured, said sleeve defining said unthreaded shoulder region.

4. The pivoting chain tensioner arm assembly as set forth in claim 1, wherein said plurality of resilient fastener retaining tabs are arranged symmetrically relative to each circumferentially about said pivot axis.

5. The pivoting chain tensioner arm assembly as set forth in claim 1, further comprising:
   a bracket abutted with said rear face of said tensioner arm, said bracket comprising a ramp surface supporting a free end of said tensioner arm that is spaced from said pivot bore.

6. The pivoting chain tensioner arm as set forth in claim 1, wherein said tip of each fastener retaining tab is located either:
   (i) closer to said rear face than said front face of said tensioner arm; or
   (ii) closer to said front face than said rear face of said tensioner arm.

* * * * *